US006977771B2

United States Patent
Asao et al.

(10) Patent No.: US 6,977,771 B2
(45) Date of Patent: Dec. 20, 2005

(54) OPTICAL AMPLIFIER SUPERVISORY CONTROL METHOD IN WDM COMMUNICATION SYSTEM

(75) Inventors: Taro Asao, Kawasaki (JP); Nobuyuki Nemoto, Kawasaki (JP); Kazuo Tanaka, Kawasaki (JP); Kazunori Horachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 634 days.

(21) Appl. No.: 10/083,162

(22) Filed: Feb. 27, 2002

(65) Prior Publication Data

US 2003/0099032 A1 May 29, 2003

(30) Foreign Application Priority Data

Nov. 29, 2001 (JP) ........................................ 2001-363620

(51) Int. Cl.[7] .............................. H01S 3/00; H04B 10/16
(52) U.S. Cl. ............................ 359/341.41; 359/341.42; 398/181
(58) Field of Search ........................ 359/341.41, 341.42; 398/181

(56) References Cited

U.S. PATENT DOCUMENTS

| | | | |
|---|---|---|---|
| 5,966,237 A | 10/1999 | Sugaya et al. ............. 359/341 |
| 6,157,481 A | 12/2000 | Sugaya et al. ............. 359/337 |
| 6,400,497 B1 * | 6/2002 | Suzuki et al. ........... 359/337.11 |
| 6,411,429 B1 * | 6/2002 | Tomofuji et al. ........... 359/337 |
| 6,583,909 B1 * | 6/2003 | Wada ......................... 398/177 |
| 6,621,625 B1 * | 9/2003 | Zhang et al. ........... 359/341.42 |
| 6,690,506 B2 * | 2/2004 | Zahnley et al. ........ 359/337.11 |

FOREIGN PATENT DOCUMENTS

JP          2003174421 A   *   6/2003

\* cited by examiner

*Primary Examiner*—Mark Hellner
(74) *Attorney, Agent, or Firm*—Staas & Halsey LLP

(57) ABSTRACT

The gain control circuit controls the amplification ratio of EDFA based on the results of having measured the input power monitor which monitors the EDFA input optical level which amplifies light and of having measured the output power monitor which monitors the output optical level. The optical pre-amplifier receives a notice of the number of wavelengths from a fore node and a notice of whether the optical post-amplifier of a fore node is in normal operation by a supervisory control signal, and changes over the gain control circuit to either the ALC or AGC mode. When the number of wavelengths changes while the optical pre-amplifier is operating in the ALC mode, the optical pre-amplifier is controlled in the AGC mode using the backed-up amplifier gain. Also, the gain value when the optical pre-amplifier is in routine operation is backed up in an amplifier gain back-up unit and an back-up unit.

20 Claims, 11 Drawing Sheets

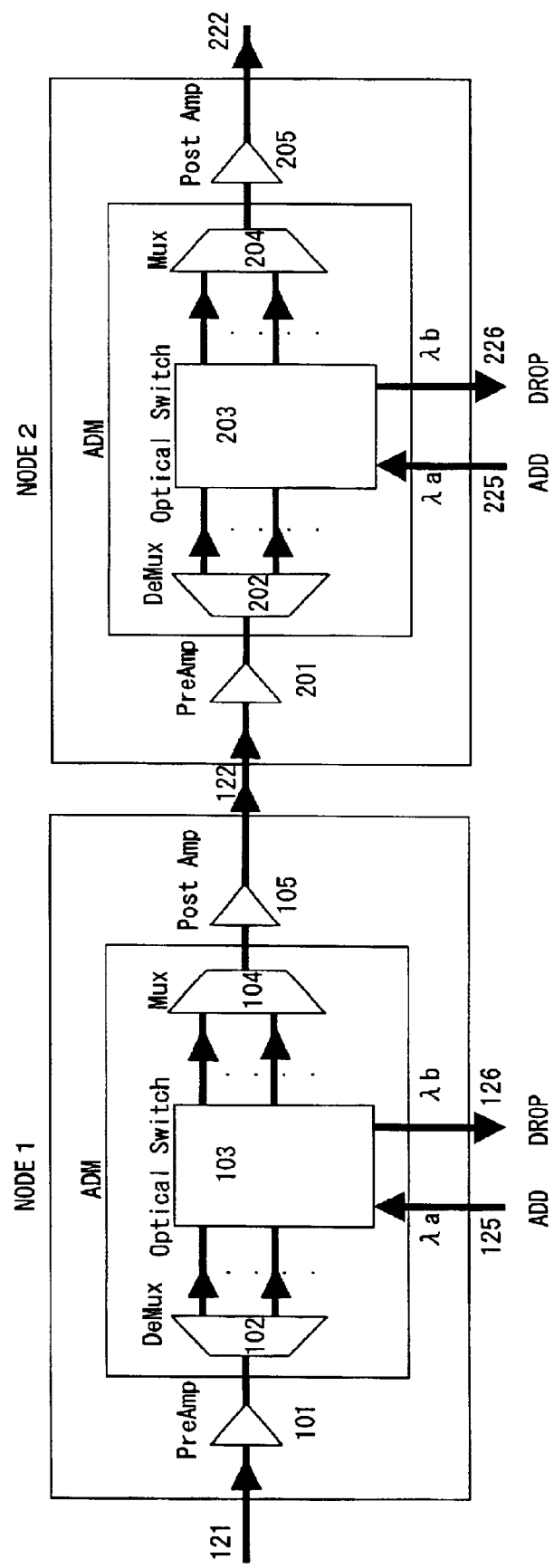
F I G. 5

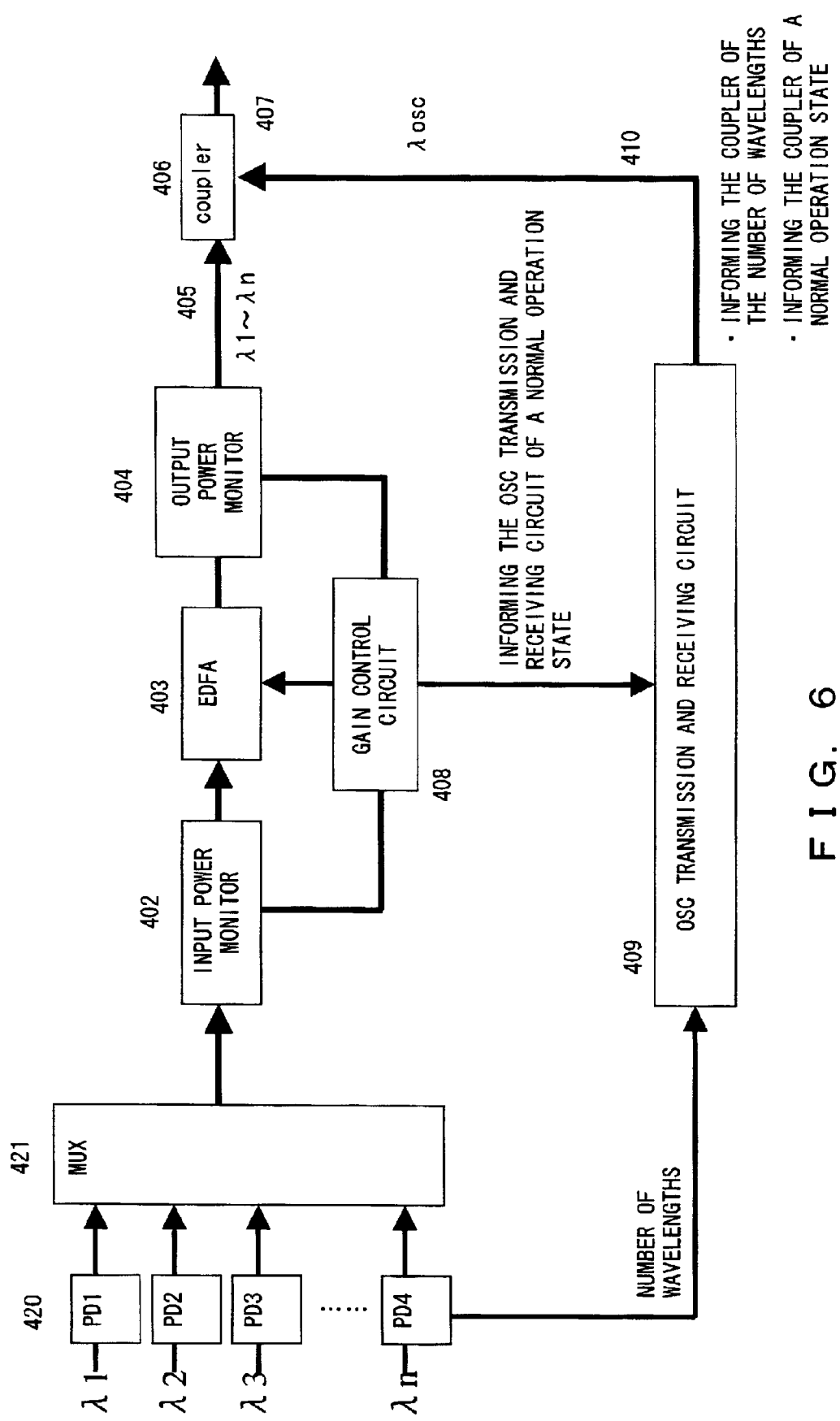
F I G. 6

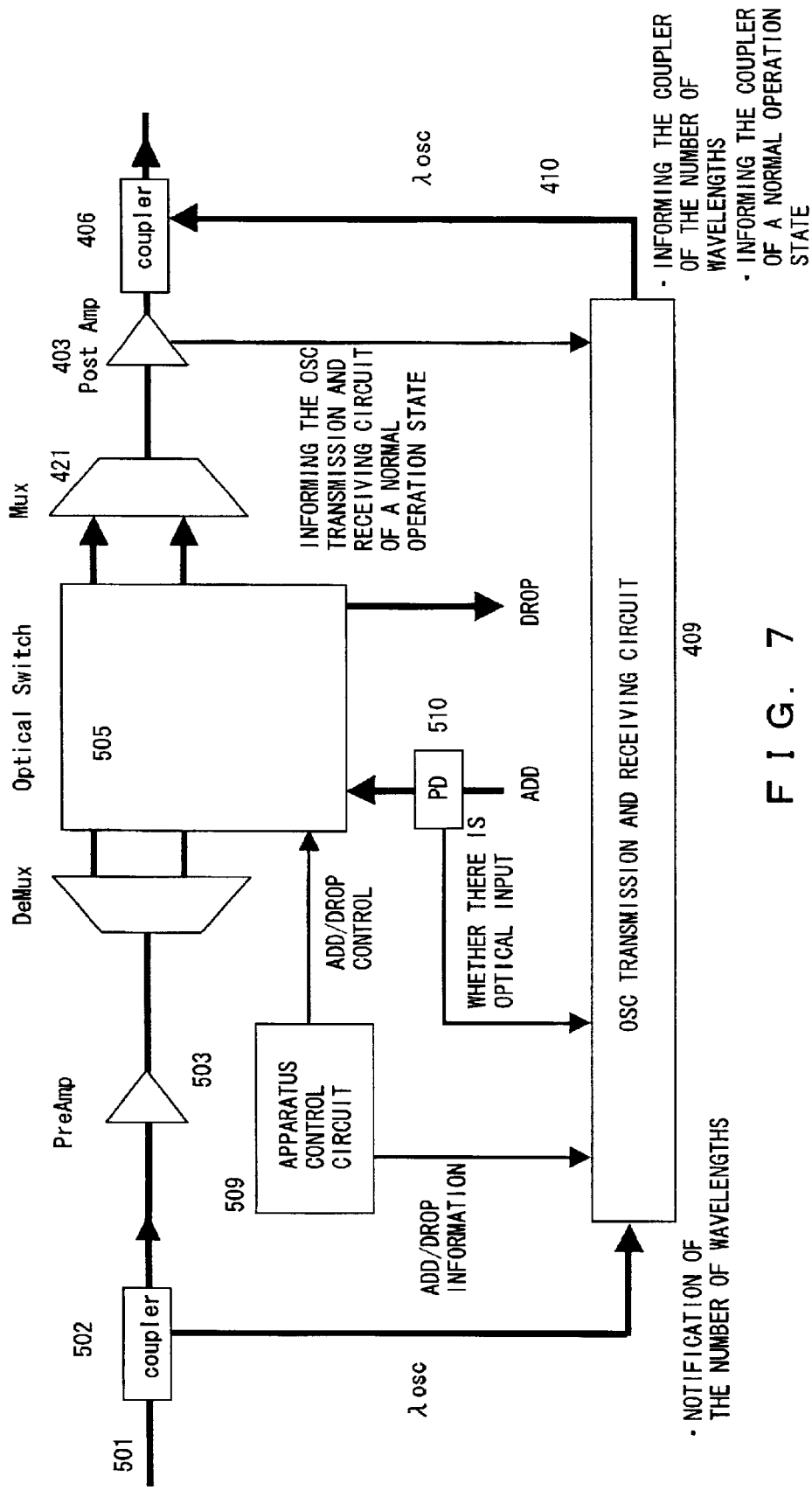
F I G. 7

OPTICAL AMPLIFIER SUPERVISORY CONTROL METHOD IN WDM COMMUNICATION SYSTEM

BACKGROUND OF THE INVENTION

1. Field of the Invention

The present invention relates to a WDM (Wavelength Division Multiplexing) transmission apparatus and an optical amplifier control system which are used for a WDM communication network, and more specifically to an optical amplifier control system which supports an optical wavelength ADM (add drop multiplexing) function and an optical path protection function in the WDN communication network.

2. Description of the Related Art

Optical transmission which uses WDM technology has come into practical use in an optical transmission apparatus, and a WDN ring network using an optical ADM apparatus which supports the ADM function, which operates in the unit of optical wavelengths, and the optical path protection switch function is also coming into practical use.

FIG. 1 shows an example of the constitution of a WDM communication system having the ADM function. A signal from an upper stream (fore node) is transmitted using a transmission path 121, and after being amplified by an amplifier (multi-wavelength optical pre-amplifier) 101, said signal is separated into each individual wavelength by DEMUX (wavelength separator) 102; and after channel selection (through/add/drop) is made by an optical switch 103, said signal is multiplexed by MUX (wavelength multiplexer) 104; and said signal is amplified by a post-amplifier (multi-wavelength post-amplifier) 105, and is transmitted to a downstream (next node) by a transmission path 122.

Also, after the signal which is transmitted by the transmission path 124 is amplified by a pre-amplifier (multi-wavelength optical pre-amplifier) 115, said signal is separated into each individual wavelength by DEMUX (wavelength separator) 114; after channel selection (through/add/drop) is made by the optical switch 103, said signal is multiplexed by MUX (wavelength multiplexer) 112; said signal is amplified by a post-amplifier (multi-wavelength optical post-amplifier) 111, and is transmitted to the downstream (next node) by the transmission path 123.

λa which enters the optical switch 103 from a transmission path 125 can be added to the transmission paths 122 and 123 by the optical switch 103, and λb can be drawn out (dropped) from the transmission paths 121 and 124 by the optical switch 103, and can be transmitted to the transmission path 126.

ALC and AGC can be considered as a method of controlling a multi-wavelength amplifier (pre-amplifier or post-amplifier) used for the WDM communication system.

ALC (Automatic Level Control) Mode

Given the condition that multi-wavelength is n, and target output level per wave is Pn, the ALC (Automatic Level Control) mode is the mode of controlling the gain of an optical amplifier so that the total output Po of the optical amplifier may become constant (=n×Pn) regardless of the optical input level of the optical amplifier.

The ALC mode controls the optical amplifier so that the total output level of the optical amplifier may become constant even if the input level of the optical amplifier fluctuates.

Please note that one of the multiplexed wavelengths is cut off in the optical signal which is inputted in the optical amplifier, and the wavelengths other than the one which was cut off are amplified to a greater degree because the ALC mode tries to keep the total output level constant.

Also, when a new wavelength is added to the optical signal which is inputted in the optical amplifier, the optical amplifier output level per wavelength decreases because the ALC mode tries to keep the total output level constant.

In this way, when the number of wavelengths which are inputted in the optical amplifier increases or decreases, the output level of each individual wavelength changes, so that when the output level of each wavelength deviates from the input tolerance of the O/R module which receives this wavelength, the signal makes an error. In prior arts, in order to solve such a problem that the ALC mode had, a method of multiplexing a pilot signal and controlling the pilot signal to keep the level of the pilot signal constant is considered. In this method, however, extra light (pilot signal) must be always kept multiplexed, so it is necessary to mount the parts for transmitting or receiving, multiplexing, and separating the pilot signal, thus causing the cost to be great and making the size of the apparatus large. Also, when the pilot signal is used, there is a problem in that power consumption increases.

Also, there is a method in which an optical supervisory channel (OSC) is provided, the OSC informs each optical amplifier of multiplexed wavelength information, each amplifier changes the target total output level based on this information, and the gain is controlled.

AGC (Automatic Gain Control) Mode

The AGC mode is the mode for keeping the ratio (gain) of the optical input level and the optical output level of the optical amplifier constant.

When the input level of the optical amplifier fluctuates, the output level of the optical amplifier also changes in accordance with the input level because the gain of the optical amplifier is constant. When the wavelength multiplexing number of an optical signal which is inputted in the optical amplifier changes, if the input level of each individual wavelength does not change, the output level of each individual wavelength does not change either because the gain is constant. So, even if a new wavelength is added or deleted, the service using the existing wavelength is not affected.

(1-1) In the WDM system using the ALC mode, there is the following problem in the prior art in which a supervisory control signal of the optical amplifier is transmitted via the OSC to control the gain. When the number of optical wavelengths is changed, each amplifier is informed of that information via the OSC. Each amplifier controls the gain in accordance with the new number of wavelengths based on that information. At that time, however, if the optical signal after the number of the wavelengths has been changed is inputted into the optical amplifier before each amplifier is informed of the new information on the wavelengths which have been added, the optical amplifier output level of each wavelength fluctuates owing to the influence of the ALC mode, and if said level deviates from the receiving light tolerance of the receiving side, that would cause an error.

(1-2) In order to solve the above-mentioned problem, a method of keeping the amplifier output per wavelength constant by multiplexing the pilot signal and controlling the signal level of that pilot signal in a constant level can be considered. In this method, however, extra light (pilot signal) must be always kept multiplexed, so it is necessary to mount parts and circuits for transmitting or receiving the pilot signal, thus causing the cost for the parts and circuits as well as the power to be spent extra.

(1-3) Also, as another method of controlling the optical amplifier, there is a method in which the transmission power of the optical amplifier is monitored, the next downstream node is informed of the monitored transmission power information via the OSC, the transmission power information of the fore node is obtained in the next node, and the gain of the optical amplifier is controlled so that the optical amplifier output of said node may become the same as the transmission power of the fore node. However, in the event that the number of wavelengths increases or decreases in the fore node and the transmission power changes, if an optical signal whose number of wavelengths has been changed is inputted into the optical amplifier before the next node is informed of the new transmission power information, the gain of the optical amplifier cannot be correctly controlled, and if said output level deviates from the receiving light tolerance on the receiving side, that would result in an error or the incapability of receiving the information, thus affecting the service for which said wavelength is used.

(2) In the WDM system of prior art in which the gain of the optical amplifier is controlled in the AGC mode, there is the following problem. In the operation of the WDM system based on the AGC mode, when the WDM system is started, it is necessary to measure the optical loss between the nodes and set the amplifier gain so as to compensate for the loss. However, in the measurement which is carried out using measuring equipment, the loss changes between the state where the measurement equipment is connected and the state where connectors are engaged in a practical use, so it is not easy to accurately measure the loss including the loss in the connector junction. If the accuracy of measuring the optical loss is bad, it is necessary to consider an extra level margin when originally designing an optical line. Therefore, there is plenty of demand that the booting (gain setting) of the optical amplifier including the optical loss measurement should be automated.

(3) Also, there is another problem as follows. The optical loss of the optical fiber used for connection between the nodes changes due to environmental conditions such as temperature and physical bending, so in the WDM system which controls the gain of the optical amplifier in the AGC mode, an extra level margin must be considered for such an optical loss when the optical line is designed, the design of the optical line becomes all the more difficult, and the optical amplifier whose output for absorbing these levels of changes is large and a VAT (variable optical attenuator) whose attenuation is large must be used, inevitably making the cost of the parts high.

(4) FIG. 2 shows an example of the WDM communication network. In the event that any fault occurs to the clockwise working path in the WDM ring network shown in FIG. 2, when a path protection switch for switching an optical wavelength to a counter-clockwise protection path is realized, the path of the optical wavelength is switched over by the protection switch, so that the number of wavelengths which are inputted into the optical amplifier changes from 0 to the number of wavelengths to be protected, and the optical input level changes rapidly. In the path through which an optical signal usually does not pass, like a protection path, since there is no optical input or output level, the optical amplifier cannot be controlled by ALC or AGC, so the optical amplifier must be kept shutdown. However, there is a problem in that it takes time to start the optical amplifier from a shutdown state when the path of the optical wavelength is switched over by the protection switch.

SUMMARY OF THE INVENTION

The purpose of the present invention is to provide an inexpensive optical-amplifier supervisory control method which can automatically carry out gain adjustment and startup.

The optical-amplifier supervisory control method of the present invention is an optical-amplifier supervisory control method in an optical node including an optical amplifier and an optical post-amplifier, and comprises a step which automatically controls the gain of the optical post-amplifier and a step which starts the optical amplifier, when being started up, by the automatic level control mode, and controls the optical amplifier, when being in routine operation, by automatic gain control, and carries out an automatic level control for every specified period during the routine operation.

According to the present invention, it is possible to provide an inexpensive optical-amplifier supervisory control method which can automatically carry out gain adjustment and startup.

BRIEF DESCRIPTION OF THE DRAWINGS

FIG. 5 is the diagram which briefly shows two adjacent nodes by paying attention to the one-side direction of a constitution example of a WDM transmission apparatus having an ADM function;

FIG. 6 is an example showing the WDM apparatus 104 and the optical post-amplifier 105 shown in FIG. 5 according to the embodiment of the present invention;

FIG. 7 is an example showing another constitution of the optical post-amplifier according to the embodiment of the present invention;

DESCRIPTION OF THE PREFERRED EMBODIMENTS

Figure 1:
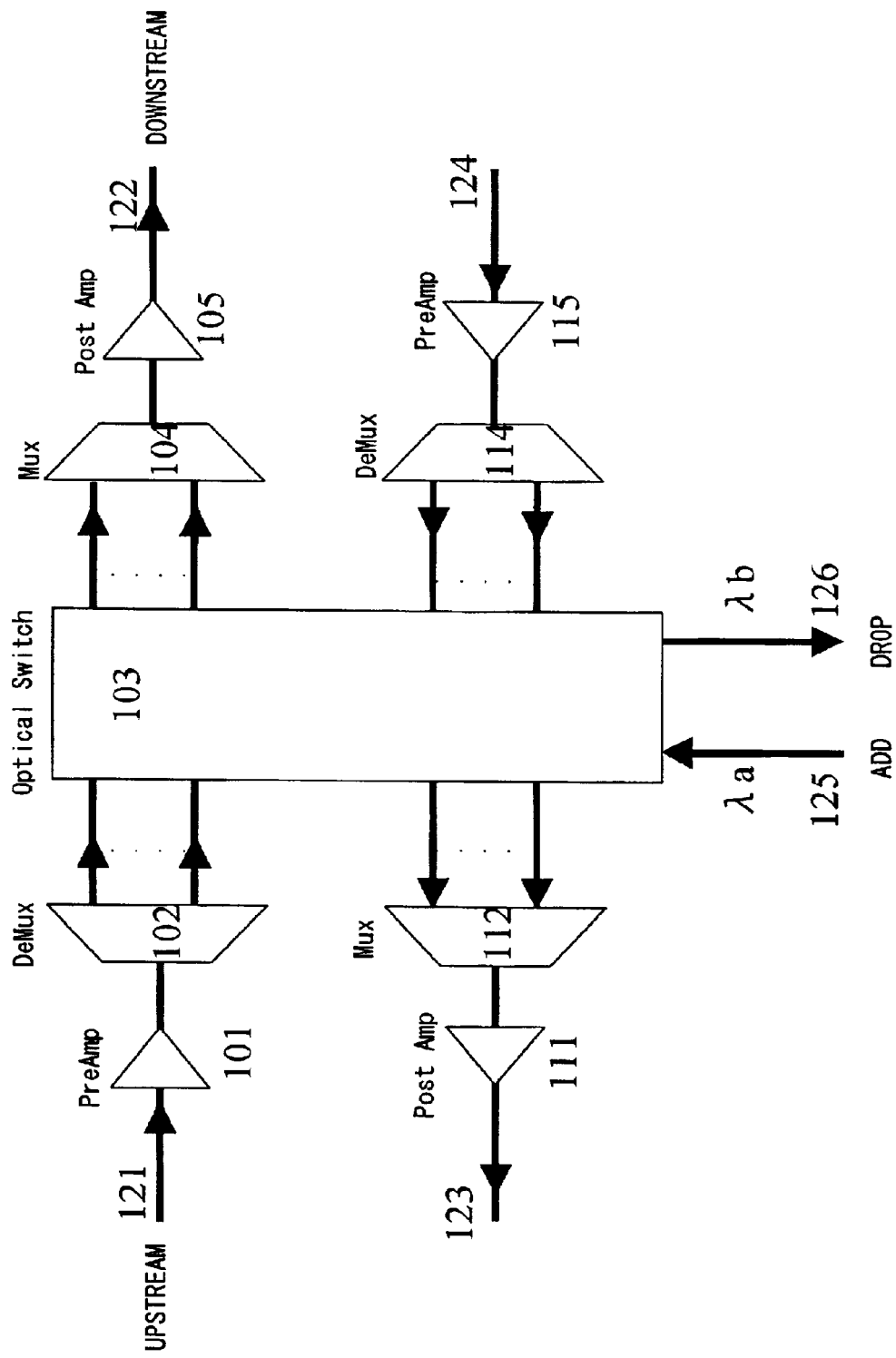
FIG. 1 shows an example of the constitution of a WDM communication system having an ADM function.
Figure 2:
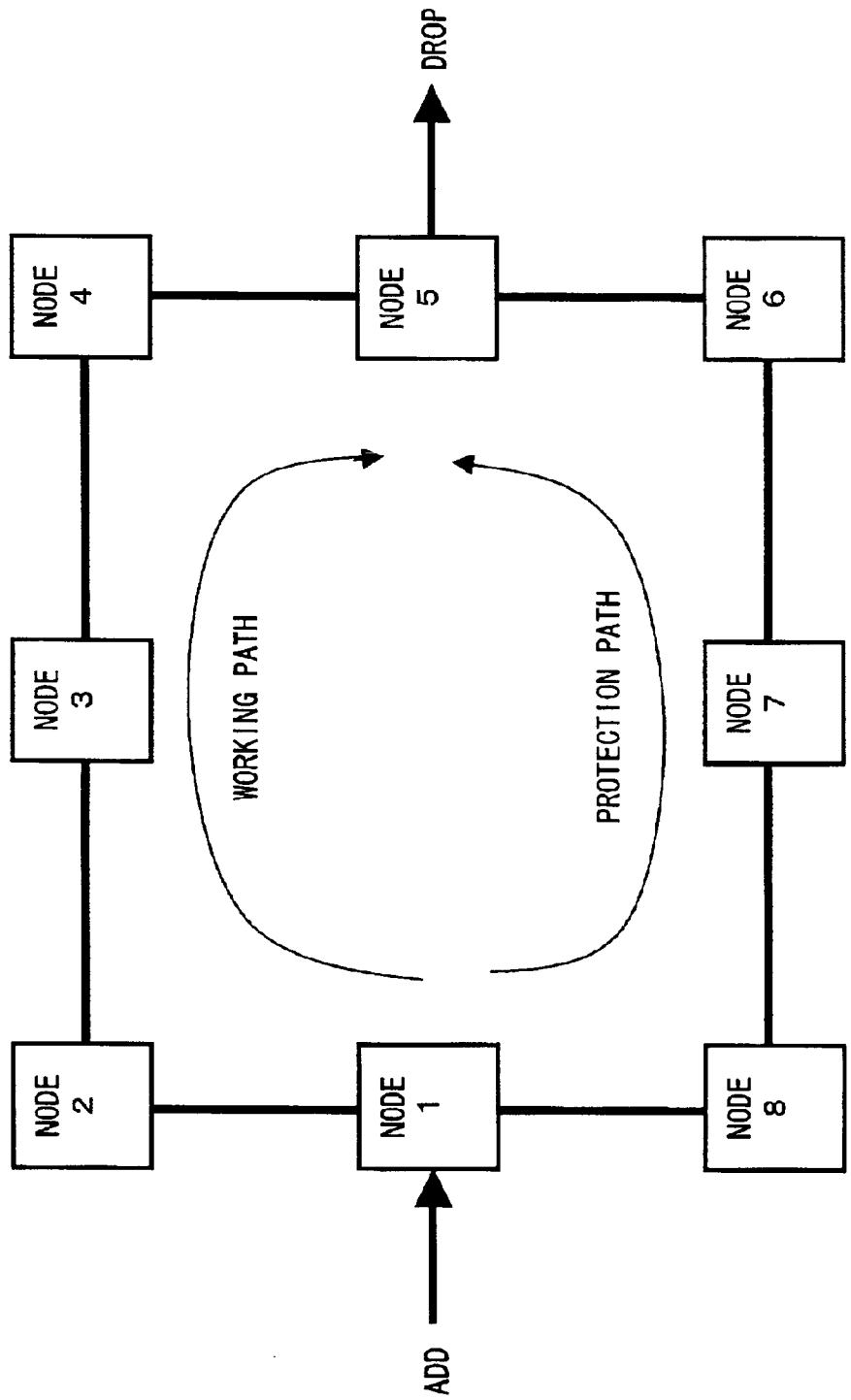
FIG. 2 shows an example of a WDM communication network.

In the embodiment of the present invention, the WDM transmission apparatus comprises an optical amplifier, an AGC circuit which carries out automatic gain control, an input power monitor which monitors the input optical level of the optical amplifier, and an OSC transmission and receiving circuit which transmits and receives a supervisory control signal; the next node is informed of the number of optical wavelengths of the optical post-amplifier via the OSC; when the input optical level which is monitored by the input power monitor falls within a specified range and the gain of the optical amplifier falls within a specified range, the next node is informed of a normal operation state via the OSC; when the input optical level deviates from the specified range, the normal operation state is cleared. Also, when the number of optical wavelengths changes, the next node is informed of a new number of optical wavelengths via the OSC.

The WDM transmission apparatus comprises a gain control circuit which has two control modes, ALC and AGC, an amplifier gain back-up unit, an OSC transmission and receiving circuit which transmits and receives a supervisory control signal, a guard-time timer which has a longer timed-out time than the time required to process and transfer supervisory control information between the nodes; a longer time is taken for the ALC time constant than the time required to process and transfer the supervisory control information between the nodes; even if the number of optical wavelengths or the optical level fluctuate during operation in the ALC mode, the gain of the optical pre-amplifier is kept almost unchanged in the period until new supervisory control information (the number of optical wavelengths and the normal operation state) is transmitted from the fore node.

When the optical pre-amplifier is initially started, the optical pre-amplifier is started in the ALC mode by receiving a notice of the normal operation state from a fore node via the OSC, and when the output of the optical pre-amplifier falls within a target output range for more than a specified time, the amplifier gain at that moment is backed up, and when the amplifier gain at that moment is backed up and continues during the period until the guard-time timer gets timed-out, the optical pre-amplifier is changed over to the AGC mode.

While the optical amplifier is in operation in the AGC mode, the optical pre-amplifier is periodically changed over to the ALC mode, and when the output of the optical pre-amplifier falls within a target output range for more than a specified time, the amplifier gain at that moment is substituted on the amplifier gain back-up unit and is backed up, and when the guard-time timer is started and the normal operation state from the fore node continues during the period until the guard-time timer gets timed-out, the optical pre-amplifier is returned to the AGC mode.

The WDM transmission apparatus has a back-up unit which backs up the gain of the optical pre-amplifier in a non-volatile memory, and backs up, in the back-up unit, the amplifier gain backed up in the amplifier gain back-up unit when the optical pre-amplifier is changed over from ALC to AGC.

In the optical pre-amplifier which has two control modes, ALC and AGC, when a notice of a normal operation state from a fore node is cleared or the number of wavelengths changes while the optical per-amplifier is controlled in the ALC mode, the ALC mode is stopped; if an effective gain value of the optical amplifier is backed up, the optical pre-amplifier is transferred to the AGC mode using the backed-amplifier gain value; if an effective gain of the optical pre-amplifier is not backed up, the output of the optical pre-amplifier is shutdown until the optical pre-amplifier receives a notice of a normal operation state again.

In the optical pre-amplifier which has two control modes, ALC and AGC, when the optical pre-amplifier is re-started after a power failure occurs and is restored to a normal state, if an effective gain value of the optical amplifier is backed up, the optical pre-amplifier is controlled in the AGC mode and re-started using the backed-up amplifier gain; if an effective gain value of the optical amplifier is not backed up, the optical pre-amplifier is re-started in the ALC mode.

An optical signal is inputted into the optical amplifier to boot the optical amplifier, and the optical amplifier gain is kept backed up. When there is no optical signal input, the optical amplifier is kept shutdown. When an optical signal is inputted again later, the optical amplifier is controlled in the AGC mode and is re-started by the backed-up optical amplifier gain.

The WDM transmission apparatus comprises an optical pre-amplifier which has two control modes, ALC and AGC, an apparatus control unit which has a back-up unit backing-up the control information of the optical pre-amplifier, a non-volatile memory unit which backs up the serial number of the optical pre-amplifier, and a non-volatile memory unit which backs up the serial number of the shelf in which the optical pre-amplifier is accommodated; the serial number of the optical pre-amplifier and the serial number of the shelf in which the optical pre-amplifier is accommodated are backed up together with the optical pre-amplifier gain in the back-up unit; when the optical pre-amplifier is started after a power failure occurs, the serial numbers of the optical pre-amplifier and the shelf are compared with the serial numbers of the backed-up optical pre-amplifier and the backed-up shelf; only when these values coincide, the backed-up optical pre-amplifier gain is judged to be effective; starting the optical pre-amplifier in the AGC mode using a wrong gain value when the apparatus control unit is replaced is prevented by re-starting the optical pre-amplifier in the AGC mode using the backed-up amplifier gain.

Another control method of the optical amplifier has an optical pre-amplifier which has two control modes, ALC and AGC, a memory unit which backs up amplifier gain, and an OSC transmission and receiving circuit which transmits and receives a supervisory control signal; a longer time is taken for the ALC time constant than the time required to process and transfer the supervisory control signal between the nodes; the optical pre-amplifier is started in the ALC mode by receiving a notice of a normal operation state from a fore node via the OSC; when the output of the optical pre-amplifier falls within a target output range for more than a specified time, the amplifier gain of that moment is backed up.

After that, if the output of the optical pre-amplifier is within a target output range, the amplifier gain which is periodically backed up is updated to the amplifier gain of that moment.

When wavelength number information received via the OSC changes during operation in the ALC mode, the ALC mode is changed over to the AGC mode which uses the amplifier gain backed up in the memory. After that, if the number of wavelengths does not change and the output of the optical pre-amplifier is within a target output range and is stable, the mode is returned to the ALC mode again.

According to the embodiment of the present invention, a fore node informs the next node of a normal operation state when the input of the optical post-amplifier is within a specified level. At that time, the optical post-amplifier is controlled in the AGC mode, so the output level is also within a specified level. While the next node which receives this optical output is receiving a notice of the normal operation state, the optical level which is inputted into the optical pre-amplifier is deemed to be constant, and when the optical pre-amplifier has not been started yet, startup of the optical pre-amplifier is begun in the ALC mode. The optical pre-amplifier is controlled in such a way that the output of the optical pre-amplifier falls within a target output level and becomes constant in the ALC mode. When the output level is within a target output level range for longer than a specified time, the amplifier gain of that moment is backed up in the amplifier gain back-up unit; when the normal operation state from the fore node continues in the period until the guard time timer gets timed-out, said state is transferred to the AGC mode using the amplifier gain backed up in the amplifier gain back-up unit. According to this optical amplifier control method, it is possible to automatically set the amplifier gain according to the optical loss between the nodes. Also, since it is unnecessary to change the connection of the connectors, contrary to such a case where the optical loss between the nodes is measured using measurement equipment, the optical loss including the loss in the connector junction can be accurately measured, thus making it unnecessary to take an extra loss margin into consideration when designing optical circuits.

Even if the number of wavelengths or the output of the optical post-amplifier of the fore node fluctuates due to the increase and decrease of the number of wavelengths, etc. before the gain setting in the ALC mode is completed, a long time is taken for the ALC time constant so that the gain of the optical pre-amplifier may remain almost unchanged in the same period as the time required to process and transfer the supervisory control information between the nodes. Consequently, even if an optical signal whose number of wavelengths has been changed is inputted before the next node is informed of new information on the wavelengths which have been increased or decreased, the output of the optical pre-amplifier does not produce such a level fluctuation that gives rise to an error.

Figure 3:
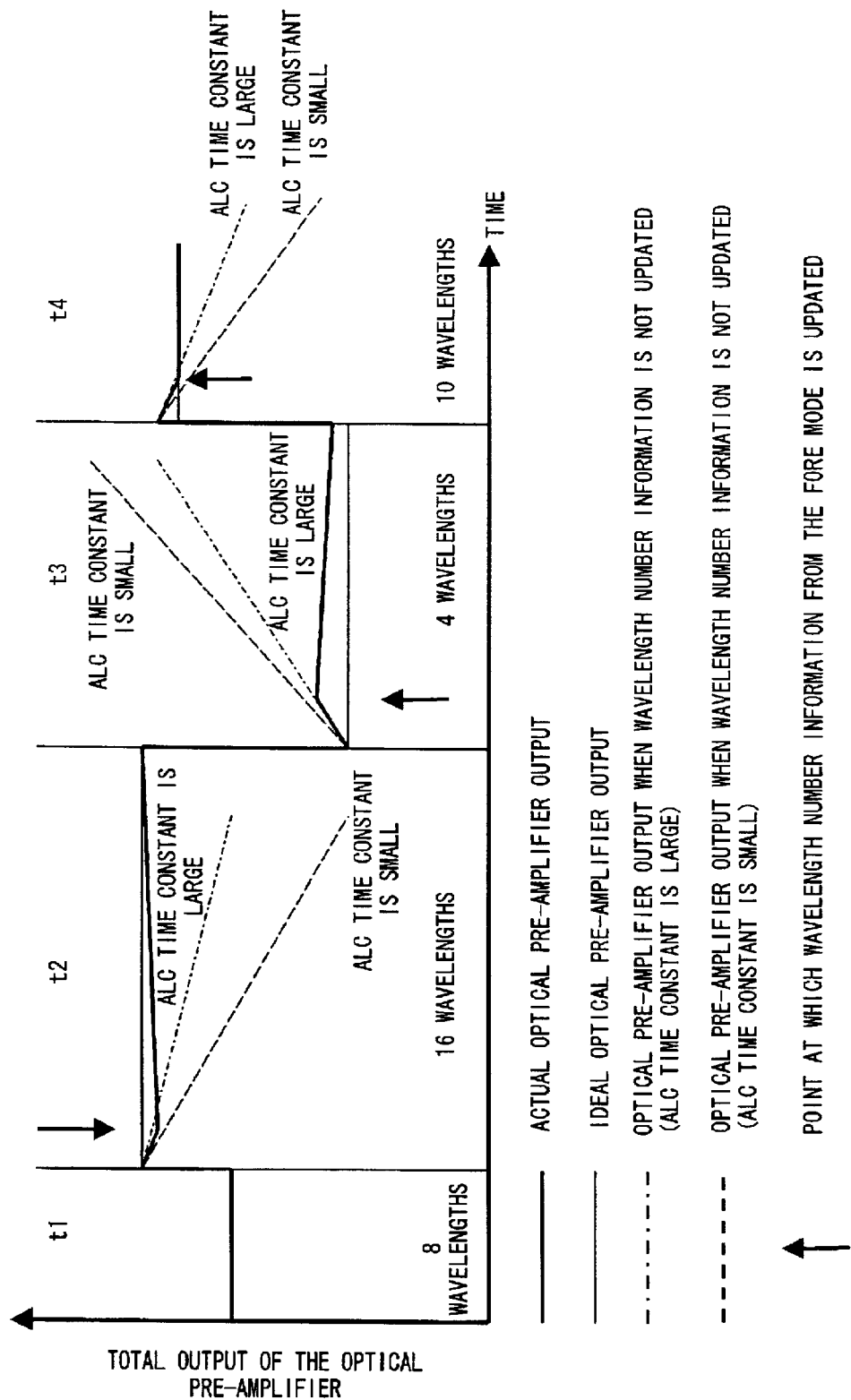
FIG. 3 is the diagram (diagram 1) showing the effect of ALC time constant when the ALC mode is used.
Figure 4:
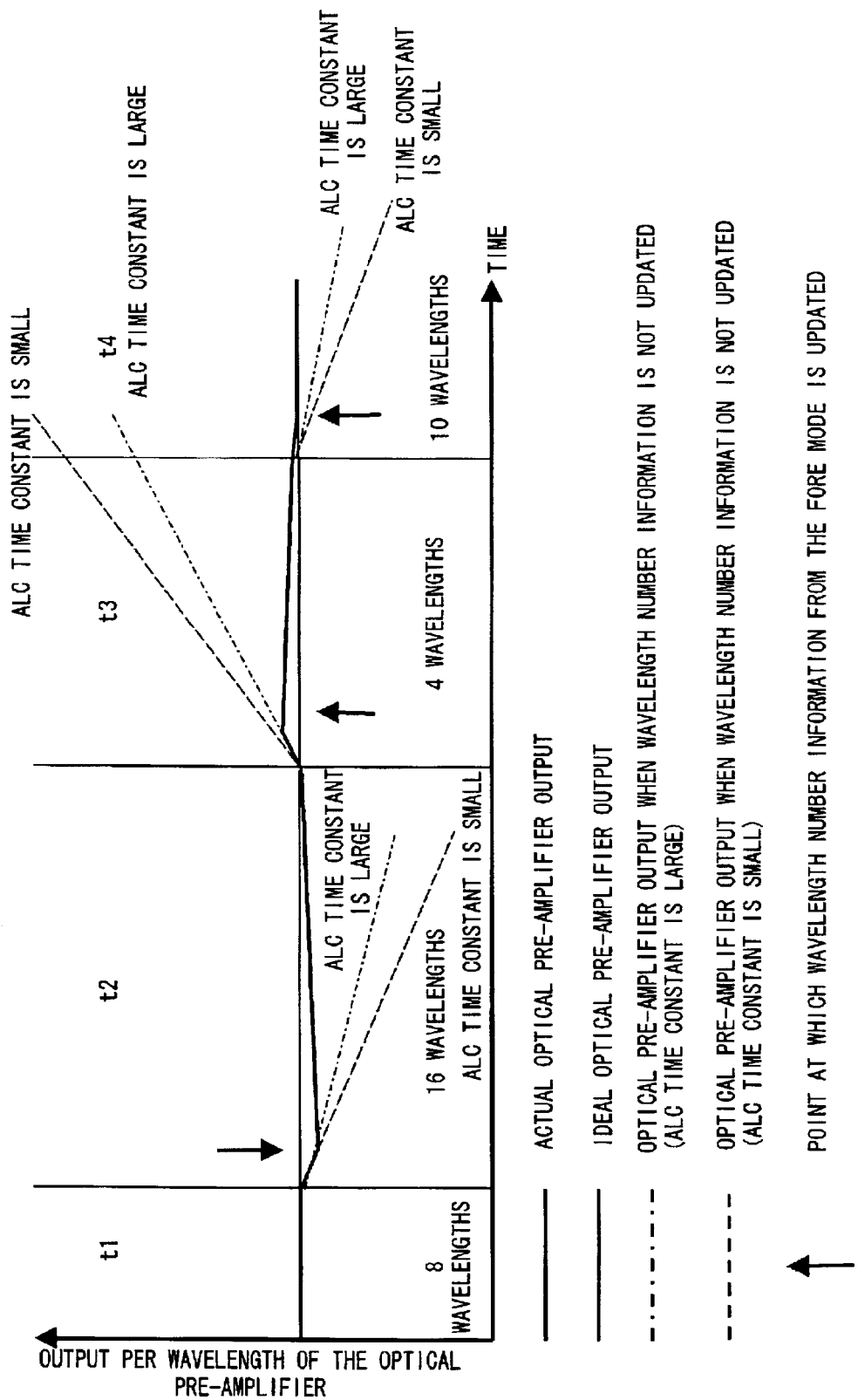
FIG. 4 is the diagram (diagram 2) showing the effect of ALC time constant when the ALC mode is used.

FIG. 3 and FIG. 4 are the diagrams showing the effect of ALC time constant when the optical pre-amplifier is operated in the ALC mode. In FIG. 3, the vertical axis is the total output of the optical pre-amplifier, and the horizontal axis is time. The number of wavelengths which are inputted into the optical pre-amplifier in the period of t1 is 8. The number of wavelengths which are inputted into the optical pre-amplifier in the period of t2 is 16. The number of wavelengths which are inputted into the optical pre-amplifier in the period of t3 is 4. The number of wavelengths which are inputted into the optical pre-amplifier in the period of t4 is 10. Also, FIG. 4 is the diagram in which the vertical axis of FIG. 3 is re-written as the output per wave of the optical pre-amplifier. When the number of wavelengths inputted into the optical pre-amplifier which is operated in the ALC mode changes, the optical pre-amplifier is controlled so that the output of the optical pre-amplifier may become the same as the total output of the optical pre-amplifier whose number of wavelengths have been changed according to the ALC time constant (dotted lines in FIG. 3 and FIG. 4) until new information on the number of wavelengths is transferred from the fore node to the gain control circuit of the optical pre-amplifier. At that time, the larger the ALC time constant, the smaller the output change of the optical pre-amplifier per unit time, and the level fluctuation of the optical pre-amplifier output of each wavelength also becomes smaller, thus preventing an error from being easily generated.

That is, if a longer time is given for the ALC time constant than the time required to process and transfer the supervisory control information between the nodes, the optical pre-amplifier output does not produce such a level fluctuation that gives rise to an error even if an optical signal whose number of wavelengths have been changed is inputted into the optical pre-amplifier before the next node is informed of the new wavelength information.

Multiplexing an OSC signal of supervisory control information is usually performed in WDM communication, and if a normal operation state and information on the number of wavelengths are transferred to the next node using this OSC signal, it is not necessary to have an extra circuit for a pilot signal.

Also, the fluctuation of the optical loss due to external factors such as an ambient temperature of optical fiber can be corrected by periodically re-adjusting the gain of the optical pre-amplifier in the ALC mode.

Furthermore, at that time, when the optical output level of the fore node fluctuates during re-adjustment of said gain and deviates from a specified range or when the number of optical wavelengths changes, the optical pre-amplifier is returned to the AGC mode using the gain value backed up in the back-up unit so that the optical pre-amplifier output per wavelength fluctuates, thus preventing the signal from giving rise to an error.

When the optical amplifier is in routine operation, there is a possibility that the gain for the AGC mode cannot be accurately set if the gain is backed up while the optical amplifier input is fluctuating in the method that when the optical amplifier is started, the optical amplifier is started in the ALC mode in order to correct the loss between the nodes and changed over from the ALC mode to the AGC mode using the gain determined in the ALC mode in order to prevent an error due to the increase or decrease of the wavelengths or a sudden change of the number of optical wavelengths (optical level) by a path protection switch. Therefore, when the optical amplifier is started in the ALC mode, it is necessary to keep the optical level which is inputted into the optical amplifier constant.

The fore node informs the next node of a normal operation state when the output of the optical post-amplifier is within a specified level range. While the next node is receiving the notice of the normal operation state, the optical level which is inputted into the optical pre-amplifier is deemed to be constant, and startup of the optical pre-amplifier is begun. Also, when the optical output level of the fore node fluctuates while the optical pre-amplifier is being started in the ALC mode, it is possible to prevent the optical pre-amplifier from starting up by a wrong gain value by shutting down the optical pre-amplifier.

Also, when a power failure occurs and is restored to a normal state, even if the optical input level from the fore node is not stable, the optical pre-amplifier can be re-started by controlling the optical pre-amplifier in the AGC mode and starting it up using the gain value backed up in the back-up unit, and communication by the WDM system can be restored in a short time.

Furthermore, in the event that an optical signal is once inputted in advance to set and back up the optical amplifier gain of a protection path, and is used in the working path later, when the optical wavelength path is changed over from the working path to the protection path by the protection switch, the number of wavelengths which are inputted into the optical amplifier on the protection path changes from 0-wave to the number of waves to be protected. At that time, the optical amplifier can be started faster by starting the optical amplifier in the AGC mode by the optical amplifier gain which has been backed up than the optical amplifier is started up in the ALC mode, so that it is possible to solve the problem in that it takes time to start up the optical amplifier in the ALC mode, thus shortening the time of the signal breaking due to the protection switch.

When the apparatus control unit which backs up the control information of the optical pre-amplifier in a power supply-turned-off state is replaced, if the gain which has been set in another system is backed up in the back-up unit, the serial numbers of the optical pre-amplifier unit and the shelf are compared with the serial numbers of the backed up optical pre-amplifier unit and the shelf, and only when these values coincide, the backed-up amplifier gain is judged to be effective, thus enabling the optical pre-amplifier to be prevented from starting up due to a wrong setting of the gain.

Apart from the method of transferring to the AGC mode while the optical pre-amplifier is in routine operation, and the method of periodically correcting the optical pre-amplifier gain in the ALC mode, there is another optical pre-amplifier control method in which the loss fluctuation between the nodes can be always corrected by continuing the operation in the ALC mode after the optical pre-amplifier is started in the ALC mode. Also, when the number of wavelengths changes due to the increase or decrease of wavelengths or any impediment, the optical amplifier gain changes little until new information on wavelengths is transmitted from the fore node by taking a long time for the ALC time constant, and the optical pre-amplifier output does not produce such a level fluctuation that gives rise to an error. Furthermore, when the wavelength information received via the OSC changes, the optical amplifier gain fluctuates, thus preventing an error from being produced, because the optical pre-amplifier is transferred to the AGC mode using the optical amplifier gain which is periodically backed up.

FIG. 5 is the diagram which briefly shows two adjacent nodes by paying attention to the one-side direction of a constitution example of a WDM transmission apparatus having an ADM function shown in FIG. 3.

FIG. 6 is an example showing the WDM apparatus 104 and the optical post-amplifier 105 shown in FIG. 5 according to the embodiment of the present invention.

FIG. 7 is an example showing another constitution of the optical post-amplifier according to the embodiment of the present invention.

In FIG. 5, in node 1, after the WDM optical wavelength sent from the upstream via the transmission path 121 is amplified by the optical pre-amplifier 101, said wavelength is separated into each individual wavelength by the optical wavelength separator 102, and after path selection (add/drop/though) is made by the optical switch 103, said wavelength is multiplexed by the optical wavelength multiplexer 104, and then is amplified by the optical post-amplifier 105, and is sent to the next node (node 2) by the transmission path 122.

Likewise, in node 2, after the WDM optical wavelength sent from node 1 via the transmission path 122 is amplified by the optical pre-amplifier 201, said wavelength is separated into each individual wavelength by the optical wavelength separator 202, and after path selection (add/drop/though) is made by the optical switch 203, said wavelength is multiplexed by the optical wavelength multiplexer 204, and then is amplified by the optical post-amplifier 205, and is sent to the next node by the transmission path 222.

Described below is an example of the constitution and operation of the WDM apparatus and the optical post-amplifier in the embodiment of the present invention with reference to FIG. 6.

In FIG. 6, after each individual wavelength ($\lambda 1$ to $\lambda n$) is multiplexed by the optical wavelength multiplexer 421 via the monitor 420 using PD's (photo detectors), said wavelength is transmitted to the next node through the transmission path 407 via the input power monitor 402, the optical post-amplifier 403 (being composed of, typically, EDFA (Erbium Doped Fiber Amplifier)), the output power monitor 404, the optical fiber 405 and the optical coupler 406.

The monitor 420 detects whether there is any optical input of each individual wavelength, and informs the OSC transmission and receiving circuit 409 of the result. The OSC transmission and receiving circuit 409 calculates the number of wavelengths which are inputted into the WDM apparatus 421 based on that result information, i.e. the number of wavelengths which are multiplexed by the WDM apparatus 421.

Also, the input power of the optical post-amplifier 403 is monitored by the input power monitor 402, and the output power is monitored by the output power monitor 404. The gain control circuit 408 controls the optical post-amplifier 403 in the AGC mode based on these monitored values to keep the gain of the optical post-amplifier constant.

In the initial state where the optical post-amplifier 403 has not been started up yet, the gain control circuit 408 informs the OSC transmission and receiving circuit 409 of the normal operation state cleared (NOROP=0).

When the input optical level which is monitored by the input power monitor 402 falls within a specified range and the gain of the optical post-amplifier 403 falls within a specified range in the AGC mode, the gain control circuit 408 informs the OSC transmission and receiving circuit 409 of the normal operation state (NOROP=1).

The OSC transmission and receiving circuit 409 transmits the number of wavelengths which are multiplexed by the WDM apparatus 421 and the normal operation state (NOROP) information to the transmission path 410 via the supervisory control signal (OSC signal: wavelength $\lambda$ osc). After the OSC signal is multiplexed with a WDM signal ($\lambda 1$ to $\lambda n$) by the optical coupler 406, said OSC signal is transmitted to the next node through the transmission path 407.

Since the optical post-amplifier 403 is operated in the AGC mode, the optical output level is also within a specified range when the optical post-amplifier input is within a specified range. That is, when the optical post-amplifier output is within a specified range, the fore node informs the next node of the normal operation state (NOROP=1).

Instead of the above-mentioned method of calculating the number of wavelengths which are multiplexed by the monitor (PD's) placed at the stage prior to the WDM apparatus 421, the number of wavelengths can be calculated in the OSC transmission and receiving circuit 409 using the wavelength number information transmitted from the fore node via the OSC signal, the add/drop control information of the optical switch 505 from the apparatus control circuit 509 of said node, and the optical input availability information obtained which the monitor 510 monitors the wavelengths which are added by said node.

Here, if it is assumed that m: the number of wavelengths sent from a fore node, a: the number of wavelengths for which optical input actually exists for the wavelengths which are added in the working node, d: the number of wavelengths which are dropped in said node, and n: the number of wavelengths which are multiplexed by the WDM apparatus in said node and is transmitted to the next node, the number of wavelengths n which are multiplexed by the WDM apparatus in said node and are transmitted to the next node can be calculated by the following formula (however, it is assumed that the optical signal which is dropped in said node is not inputted into the WDM apparatus 421).

$$n = m - d + a$$

As has been described, the optical post-amplifier is operated in the AGC mode in the embodiment of the present invention.

Figure 8:
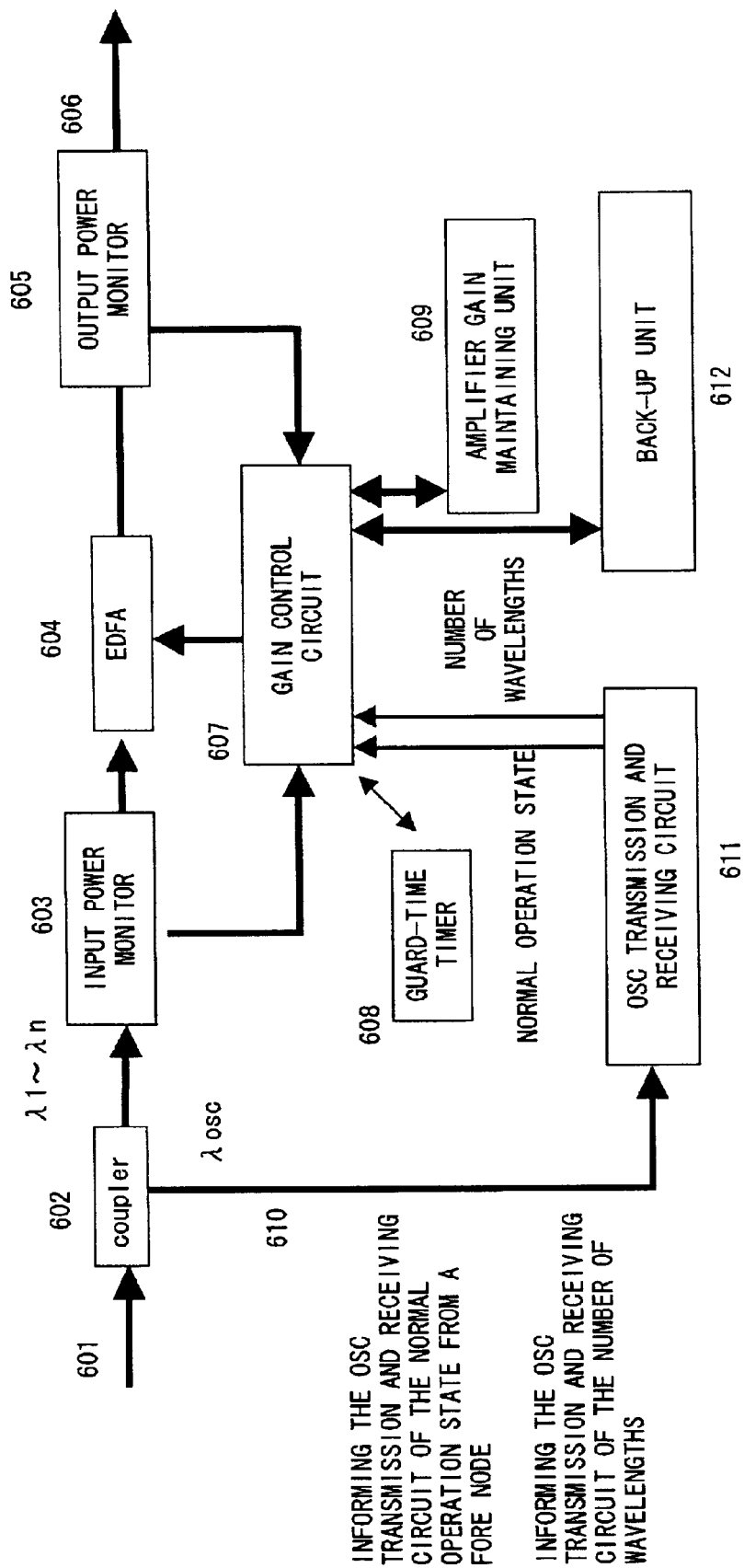
FIG. 8 is an example showing the constitution of the optical pre-amplifier according to the embodiment of the present invention.

FIG. 8 is an example showing the constitution of the optical pre-amplifier according to the embodiment of the present invention.

Described below is an example of the constitution and operation of the optical pre-amplifier in the present invention with reference to FIG. 8.

In FIG. 8, the WDM signal from a fore node is inputted into the next wavelength separator via the transmission path 601, the optical coupler 602, the input power monitor 603, the optical pre-amplifier 604 (EDFA), the output power monitor 605, and the optical fiber 606.

The guard-time timer 608 has a longer time than the time required to process and transfer supervisory control information between the nodes.

The WDM signal ($\lambda 1$ to $\lambda n$, $\lambda osc$) is separated into a wavelength for service ($\lambda 1$ to $\lambda n$) and a wavelength for supervisory control ($\lambda osc$) by the optical coupler 602, and the wavelength for supervisory control is inputted into the OSC transmission and receiving circuit 611 through the optical fiber 610.

The OSC transmission and receiving circuit 611 takes out the normal operation state information and the wavelength number information from the OSC signal sent through the supervisory control wavelength. The OSC transmission and receiving circuit 611 informs the gain control circuit 607 of the number of wavelengths out of these pieces of information.

If the optical pre-amplifier 604 is in an initial state (the optical pre-amplifier is in a shut-down state and the gain has not been set yet), when the OSC transmission and receiving circuit 611 receives the normal operation state (NOROP=1) from the fore node, the OSC transmission and receiving circuit 611 informs the gain control circuit 607 of the normal operation state.

When the gain control circuit 607 receives the notice of this normal operation state, the gain control circuit 607 monitors the output power of the optical pre-amplifier 604 by the output power monitor 605 and controls the optical post-amplifier 604 in the ALC mode so that the output level may become constant at the target output level (=target output level per wave×number of wavelengths).

If the output optical level which is monitored by the output power monitor 605 falls within tolerance and for a specified time, the gain control circuit 607 backs up the amplifier gain of that moment in the amplifier gain back-up unit 609, and starts the guard-time timer 608. When the number of wavelengths sent from the fore node changes or when the normal operation state is cleared (NOROP=0) while the guard-time timer 608 is in operation, the gain control circuit 607 stops the guard-time timer 608, and returns the optical pre-amplifier 604 to the initial state (the optical pre-amplifier has been shut down and the gain has not been set yet).

If the number of wavelengths or the normal operation state does not change, and the guard-time timer 608 gets timed-out while the guard-time timer 608 is in operation, the gain control circuit 607 changes the operation mode to the AGC mode. At that time, the gain control circuit 607 backs up the amplifier gain backed up in the amplifier gain back-up unit 609 in the back-up unit 612, monitors the input power of the optical pre-amplifier 604 by the input power monitor 603, monitors the output power by the output power monitor 605, and controls the optical pre-amplifier 604 in the AGC mode based on these monitored values, thereby keeping the gain of the optical pre-amplifier 604 constant.

After the operation mode is changed to the AGC mode, the gain control circuit 607 changes over the optical pre-amplifier to the ALC mode by either of the cycle set in advance, the time set in advance, or the request of the network monitoring device, monitors the output power of the optical pre-amplifier 604 by the output power monitor 605, and controls the optical pre-amplifier 604 in the ALC mode so that the output level may become constant at a target output level (=target output level per wave×number of wavelengths).

When the output optical level monitored by the output power monitor 605 falls within tolerable limits of the target output level and is within said range for a specified time, the gain control circuit backs up the amplifier gain of that moment in the amplifier gain back-up unit 609 and starts the guard-time timer 608. If the number of wavelengths sent from the fore node changes or the normal operation state is cleared (NOROP=0) while the guard-time timer 608 is in operation, the gain control circuit 607 stops the guard-time timer 608 and transfers to the AGC mode using the amplifier gain backed up by the back-up unit 612.

If the number of wavelengths and the normal operation state do not change, but the guard-time timer 608 gets timed-out while the guard-time timer 608 is in operation, the gain control circuit 607 changes over the operation mode to the AGC mode. At that time, the gain control circuit 607 backs up the amplifier gain backed up by the amplifier gain back-up unit 609 in the back-up unit 612, monitors the input power of the optical pre-amplifier 604 by the input power monitor 603, monitors the output power by the output power monitor 605, and controls the optical pre-amplifier 604 in the AGC mode based these monitored values, thus keeping the gain of the optical pre-amplifier 604 constant.

When power supply is turned on in a power-off state, the gain control circuit 607 confirms whether any effective amplifier gain is backed up in the back-up unit 612, and if any effective amplifier gain is backed up, the gain control circuit 607 starts the optical pre-amplifier 604 in the AGC mode using that amplifier gain.

If no effective amplifier gain is backed up, the gain control circuit 607 starts the optical pre-amplifier 604 in the same method as that of starting the optical pre-amplifier in its initial state (i.e. being shut down and the gain has not been set yet) which has already been described.

There is another function of the gain control circuit 607. After the amplifier gain is backed up in the back-up unit 612, and the gain control circuit 607 changes over the operation mode to the AGC mode, the input power monitor 603 detects that the input of the optical pre-amplifier 604 has disappeared (there is no wave), and then the gain control circuit 607 shuts down the optical pre-amplifier 604.

After that, when the input power monitor 603 detects that the input power of the optical pre-amplifier has been inputted, the gain control circuit 607 starts up the optical pre-amplifier 604 in the AGC mode using the amplifier gain backed up in the back-up unit 612, monitors the input power of the optical pre-amplifier 604 by the input power monitor 603, monitors the output power by the output power monitor 605, and controls the optical pre-amplifier 604 in the AGC mode based on these monitored values, thus keeping the gain constant.

Figure 9:
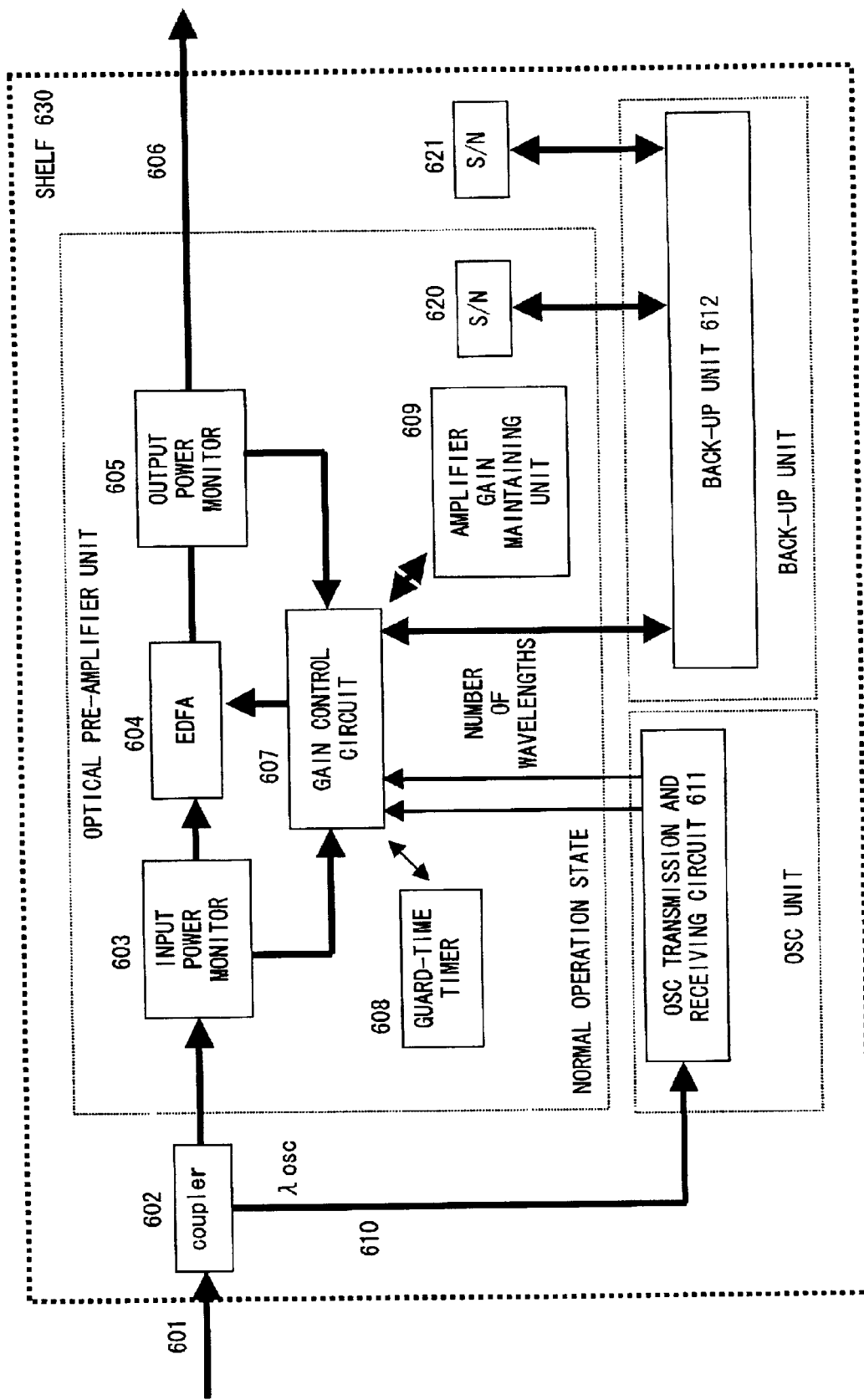
FIG. 9 is an example showing another constitution of the optical pre-amplifier according to the embodiment of the present invention.

FIG. 9 is an example showing another constitution of the optical pre-amplifier according to the embodiment of the present invention.

The serial number (S/N) of the optical pre-amplifier unit is written on the non-volatile memory 620 in advance, and the serial number of the shelf 630 is written on the non-volatile memory 621 in advance. After the optical pre-amplifier is started up in the ALC mode in the method mentioned above, when the gain control circuit changes over the operation mode to AGC mode and backs up the amplifier gain in the back-up unit 612, the serial number of the optical pre-amplifier stored in the non-volatile memory 620 and the serial number of the shelf stored in the non-volatile memory 621 are backed up together with the amplifier gain in the back-up unit 612.

When the apparatus control unit is replaced while power is off, if a new apparatus control unit was used for another apparatus in the past and the amplifier gain of that apparatus was stored in the back-up unit, using said amplifier gain as it is to control the optical pre-amplifier in the AGC mode makes it impossible to accurately correct the loss between the nodes, thereby possibly causing the main signal to make an error. In order to prevent this, when power is turned on, the amplifier gain as well as the serial numbers written on the non-volatile memory 620 and 621 for the optical pre-amplifier unit and the shelf respectively are compared with those in the back-up unit 612, and only when both factors coincide, the amplifier gain backed up in the back-up unit 612 is judged to be effective, and the optical pre-amplifier is started up using the backed-up amplifier gain.

Even when both the back-unit and the optical amplifier unit are replaced together, it is possible to prevent the optical pre-amplifier from being started up using the amplifier gain which was backed up in another apparatus, by comparing not only the serial number of the optical pre-amplifier but also the serial number of the shelf.

According to the above-mentioned invention, by eliminating and invalidating the amplifier gain backed up in the back-up unit of the apparatus control unit when the optical pre-amplifier unit is taken out, when only the optical pre-amplifier is replaced, the optical pre-amplifier is started up in the ALC mode because no effective amplifier gain is backed up. It is thus possible to correct the fluctuation of the connection loss, etc. of an optical signal which may occur due to the replacement of the optical pre-amplifier unit.

The following merits can be obtained from the above-mentioned embodiment.

Amplifier gain can be automatically set according to the optical loss between the nodes. Also, at that time, the connectors do not have to be re-connected, contrary to the case where the optical loss between the nodes is measured with measuring equipment, so that the loss including the loss in the connector junction can be accurately measured, thus making it unnecessary to take an extra loss margin into consideration when the optical circuit is designed.

Also, even if the number of wavelengths and the optical post-amplifier output of the fore node fluctuate due to the increase or decrease of the number of wavelengths before the gain setting in the ALC mode is completed, a long time is taken for the ALC time constant so that the gain of the optical pre-amplifier may remain almost unchanged in the same period as the time required to process and transfer supervisory control information between the nodes, so that even if an optical signal whose number of wavelengths have been changed before the next node is informed of new information on wavelengths which have been increases or decreased is inputted into the optical pre-amplifier, the optical pre-amplifier output does not produce such a level fluctuation that gives rise to an error. Also, it is not necessary to have any extra circuit for a pilot signal.

It is possible to correct the change of optical loss due to external factors such as an ambient temperature of an optical fiber by re-adjusting the optical pre-amplifier gain in the ALC mode periodically.

If the optical output level of the fore node fluctuates during the re-adjustment of the gain and deviates from a specified range, or if the number of wavelengths has changed, the optical pre-amplifier output per wavelength fluctuates by returning the optical post-amplifier to the AGC mode using the gain backed up in the back-up unit, thus preventing an error from being produced to the signal.

In the method wherein the optical pre-amplifier is started in the ALC mode, and is changed over to the AGC mode using the gain determined by the ALC mode while it is in routine operation, the gain for the AGC mode can be accurately set when the optical level inputted into the optical amplifier when being operated in the ALC mode is constant.

When the optical output level of the fore node fluctuates during the startup of the optical pre-amplifier in the ALC mode, it is possible to prevent the optical pre-amplifier from starting up with a wrong gain value by shutting down the optical pre-amplifier.

When power supply cuts off due to power stoppage, etc. and is restored to a normal state, even if the optical input level from the fore node is not stable, the optical pre-amplifier can be re-started by controlling the optical pre-amplifier in the AGC mode using the gain backed up in the back-up unit and re-starting it, so that communication by the WDM system can be restored in a short time.

When the number of wavelengths changes from 0 to a plurality of wavelengths, by inputting an optical signal once inputted into the optical amplifier of a protection path in advance, and setting and backing up the optical gain, the optical amplifier can be started up faster by starting it up in the AGC mode by the backed-up optical gain than starting it up in the ALC mode, thus making it possible to shorten the time of the signal stoppage due to the protection switch.

When the back-up unit which backs up the control information of the optical pre-amplifier in a power supply-turned-off state is replaced, the serial numbers of the optical pre-amplifier unit and the shelf are compared with the serial numbers of the backed-up optical pre-amplifier unit and the shelf, and only when these numbers coincide, the backed-up amplifier gain is judged to be effective, thus preventing the optical pre-amplifier from starting up using the amplifier gain backed up by another system.

It is possible to correct the loss fluctuation between the nodes at all times by continuing the ALC mode after the optical pre-amplifier is started up in the ALC mode. Even if the number of wavelengths changes due to the increase or decrease of the number of wavelengths or any obstacle, the optical amplifier gain remains almost unchanged until new wavelength number information comes from the fore node and does not produce such a level fluctuation that gives rise to an error because the ALC time constant becomes long. Also, when the wavelength number information received via the OSC changes, the optical pre-amplifier transfers to the AGC mode using the optical gain which is periodically backed up, and the optical gain fluctuates, thereby preventing an error from being produced.

According to the embodiment of the present invention, when the optical amplifier of the WDM network is started, an amplifier starting sequence (a pair of the optical post-amplifier of a fore node and the optical pre-amplifier of a next node) can be executed independently between each node, and it is not necessary to make an amplifier starting sequence among all the optical amplifiers in the network, thus making it easy to control the startup of the optical amplifier.

Figure 10:
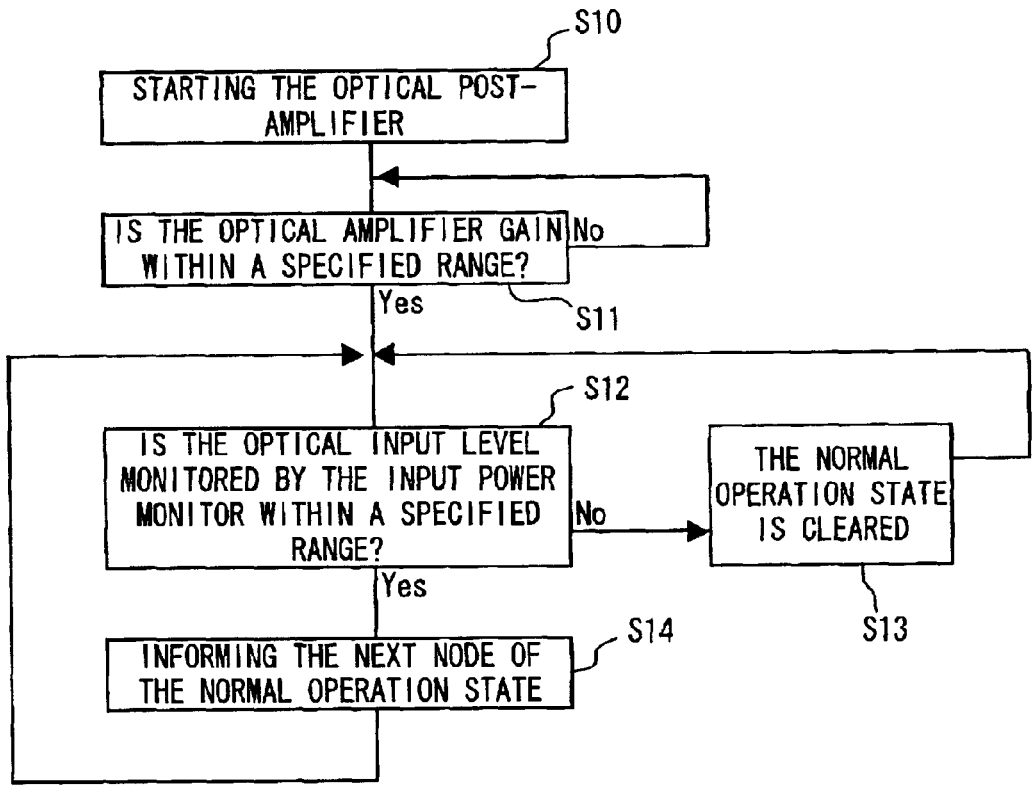
FIG. 10 shows the control flow in the gain control circuit of the optical post-amplifier according to the embodiment of the present invention.
Figure 11:
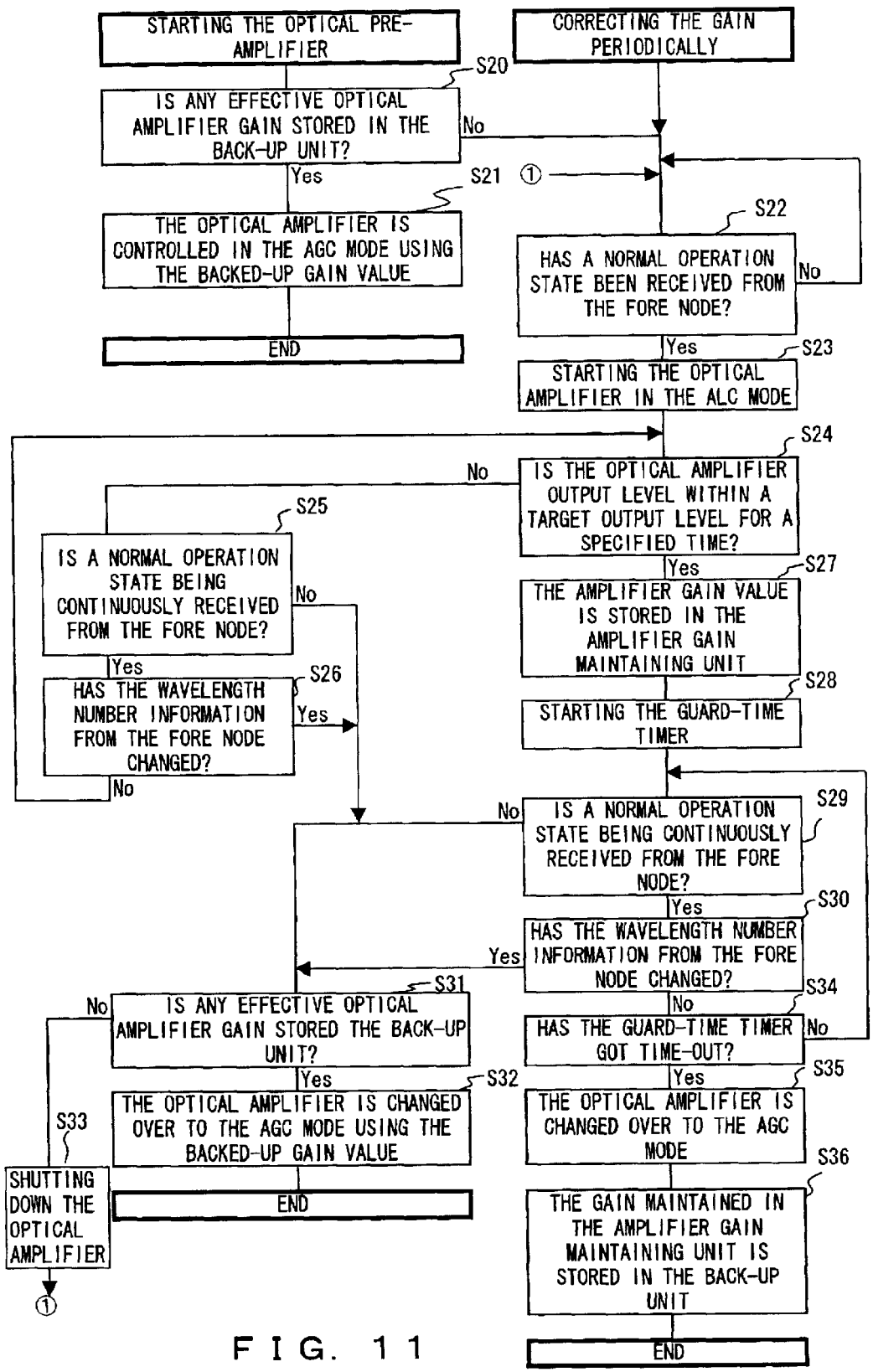
FIG. 11 shows the control flow in the gain control circuit of the optical pre-amplifier according to the embodiment of the present invention.

FIG. 10 and FIG. 11 are flowcharts of the control flow in the gain control circuits of the optical post-amplifier and the optical pre-amplifier according to the embodiment of the present invention.

FIG. 10 shows the control flow in the gain control circuit of the optical post-amplifier according to the embodiment of the present invention.

First, in step S10, start the optical post-amplifier, and in step S11, judge whether the optical amplifier gain is within a specified range. In step S11, if it is judged that the optical amplifier gain is not within a specified range, wait until the optical amplifier gain falls within the specified range. In step S11, if it is judged that the optical amplifier gain is within the specified range, judge whether the optical input level monitored by the input power monitor is with in a specified range in step S12. If the judgement is NO in step S12, clear the normal operation state in step S13, and return to step S12. If it is judged that the optical input level is within the specified range in step S12, inform the next node of the normal operation state in step 14, and return to step S12.

FIG. 11 shows the control flow in the gain control circuit of the optical pre-amplifier according to the embodiment of the present invention.

When starting the optical pre-amplifier, first, in step S20, judge whether any effective optical-amplifier gain value is stored in the back-up unit. If the judgment is YES in step S20, control the optical amplifier in the AGC mode using the backed amplifier gain value in step S21. If the judgement is NO in step S20, proceed to step S22.

In step S22, judge whether a normal operation state has been received from the fore node. If the judgement is NO, wait until it is received. If the judgement is YES in step S22, start the optical amplifier in the ALC mode in step S23, and in step S24, judge whether the optical amplifier output level is within a target range for a specified time.

If the judgement is NO in step S24, in step S25, judge whether a normal operation state is being continuously received from the fore node. If the judgement is NO in step S25, proceed to step S31. If the judgement is YES in step S25, in step S26, judge whether wavelength number information from the fore node has changed. If the judgement is YES in step S26, proceed to step S31. If the judgement is NO in step S26, proceed to step S24.

In the judgement is YES in step S24, store the optical amplifier gain in the amplifier gain back-up unit in step S27, start the guard-time timer in step S28, and in step S29, judge whether a normal operation state is being continuously received from the fore node. If the judgement is NO in step S29, proceed to step S31. If the judgement is YES in step S29, in step S30, judge whether the wavelength number information from the fore node has changed.

If the judgement is YES in step S30, proceed to step S31. If the judgement is NO in step S30, judge whether the guard-time timer has got timed-out in step S34. If the judgement is NO in step S34, return to step S29. If the judgement is YES in step S34, change over the optical amplifier to the AGC mode in step S35, and store the gain backed up in the amplifier gain back-up unit in the back-up unit in step S36.

In step S31, judge whether any effective optical-amplifier gain value is stored in the back-up unit. If the judgement is NO in step S31, shut down the optical amplifier in step S33 and return to step S22. If the judgement is YES in step S31, change over the optical amplifier to the AGC mode using the backed amplifier gain value in step S32.

According to the present invention, it is possible to provide an inexpensive optical-amplifier supervisory control method which can automatically carry out gain adjustment and startup.

What is claimed is:

1. An optical-amplifier supervisory control method in an optical node including an optical pre-amplifier and an optical post-amplifier, comprising:

automatically controlling the gain of the optical post-amplifier;

starting the optical pre-amplifier in an automatic level control mode;

controlling the optical pre-amplifier in an automatic gain control mode during normal operation; and changing the optical pre-amplifier from the automatic gain control mode to the automatic level control mode in specified periods during normal operation.

2. The optical-amplifier supervisory control method according to claim 1, further comprising:

informing a next node that the operation of the optical post-amplifier is normal, together with the number of wavelengths of an optical signal to be transmitted using a supervisory control signal when the input optical power of the optical post-amplifier falls within a specified range and the gain of the optical post-amplifier falls within a specified range.

3. The optical-amplifier supervisory control method according to claim 2, wherein the optical pre-amplifier receives a notice of a normal operation state together with the number of wavelengths from the optical post-amplifier of the fore node, is started in the automatic level control mode, and stores the optical pre-amplifier gain in the memory after the optical pre-amplifier is started.

4. The optical-amplifier supervisory control method according to claim 1, wherein in the automatic level control in each specified period while the optical pre-amplifier is in normal operation, the optical pre-amplifier stores the gain in which a specified output level is obtained in the memory.

5. The optical-amplifier supervisory control method according to claim 2, wherein the optical pre-amplifier changes over the operation mode to the automatic level control mode while it is operated in the automatic gain control mode, backs up the gain of that moment when the optical pre-amplifier output falls within a target output range for longer than a specified time, and returns to the automatic gain control mode when a notice of a normal operation state from a fore node is continuously received for a specified time.

6. The optical-amplifier supervisory control method according to claim 3, wherein when the optical pre-amplifier transfers from the automatic level control mode to the automatic gain control mode, the output of the optical pre-amplifier is shut down if a gain value is not stored in the memory.

7. The optical-amplifier supervisory control method according to claim 3, wherein when the optical pre-amplifier is re-started after a power failure occurs and then is restored to a normal state, if an effective gain value of the optical pre-amplifier is stored in the memory, the optical pre-amplifier is re-started in the automatic gain control mode using said gain.

8. The optical-amplifier supervisory control method according to claim 3, wherein the serial number of the optical pre-amplifier and the serial number of the shelf in which the optical pre-amplifier is accommodated are stored in the memory; when the optical pre-amplifier is started after a power failure has occurred, the serial numbers of the optical pre-amplifier and the shelf are compared with the stored serial numbers of the optical pre-amplifier and the shelf; when these serial numbers coincide, the optical pre-amplifier is tailed in the automatic gain control mode based on the stored gain values.

9. An optical-amplifier supervisory control system in an optical node including an optical pre-amplifier and an optical post-amplifier, comprising:
   an optical post-amplifier controlled in the automatic gain control mode;
   an optical pre-amplifier started in the automatic level control mode when it is started, controlled in the automatic gain control mode when it is in normal operation, and changed from the automatic gain control mode to the automatic level control mode in specified periods during normal operation.

10. The optical-amplifier supervisory control system according to claim 9, wherein when the input optical power of the optical post-amplifier falls within a specified range and the gain of the optical post-amplifier falls within a specified range, it is transmitted to a next node together with the multiplexed number of wavelengths of an optical signal to be transmitted that the operation of the optical post-amplifier is normal.

11. The optical-amplifier supervisory control system according to claim 10, further comprising:
   a memory unit storing the gain of the optical pre-amplifier after having been started after the optical pre-amplifier receives a notice of a normal operation state together with the multiplexed number of wavelengths from the optical post-amplifier of a fore node and after the optical pre-amplifier is started in the automatic level control mode.

12. The optical-amplifier supervisory control system according to claim 9, wherein the optical pre-amplifier stores the gain when a specified output level is obtained in the memory in controlling the optical pre-amplifier in the automatic level control mode in each specified period when the optical pre-amplifier is in normal operation.

13. The optical-amplifier supervisory control system according to claim 10, wherein when the optical pre-amplifier is periodically changed to the automatic level control mode when being controlled in the automatic gain control mode, and the output of the optical pre-amplifier falls within a target output range for longer than a specified time, the gain of that moment is backed up, and when the optical pre-amplifier receives a notice of the normal operation state from the fore node continuously for a specified period, the optical pre-amplifier returns to the automatic gain control mode.

14. The optical-amplifier supervisory control system according to claim 11, wherein if no gain value is stored in the memory when the optical pre-amplifier transfers from the automatic level control mode to the automatic gain control mode, the output of the optical pre-amplifier is shut down.

15. The optical-amplifier supervisory control system according to claim 11, wherein when the optical pre-amplifier is re-started after a power failure occurs and is restored to a normal state, the optical pre-amplifier is re-started in the automatic gain control mode if the effective gain value of the optical pre-amplifier is stored in the memory.

16. The optical-amplifier supervisory control system according to claim 9, wherein the serial number of the optical pre-amplifier and the serial number of the shelf in which the optical pre-amplifier is accommodated are stored in the memory, and when e optical pre-amplifier is started after a power failure has occurred, the serial numbers of the optical pre-amplifier and the shelf are compared with the stored serial numbers of the optical pre-amplifier and the shelf, and when both the serial numbers coincide, the optical pre-amplifier is started in the automatic gain control mode.

17. The optical-amplifier supervisory control method according to claim 1, further comprising changing the optical pre-amplifier from the automatic level control mode, used when starting the optical pre-amplifier, to the automatic gain control mode after an output of the optical pre-amplifier falls within a target output range for more than a predetermined time; and
   wherein the specified periods of said changing the optical pre-amplifier from the automatic gain control mode to the automatic level control mode occur periodically.

18. An optical amplifier supervisory control method in an optical node having an optical preamplifier and an optical post-amplifier, comprising:
   automatically controlling gain of the optical post-amplifier;
   starting the optical pre-amplifier in an automatic level control mode;
   changing the optical preamplifier from the automatic level control mode to an automatic gain control mode after an output of the optical pre-amplifier falls within a target output range for at least a first predetermined period of time; and
   periodically changing the optical pre-amplifier from the automatic gain control mode to the automatic level control mode.

19. The optical amplifier supervisory control method as claimed in claim 18, wherein said changing of the optical preamplifier from the automatic level control mode to the automatic gain control mode is repeated after each periodic changing of the optical pre-amplifier from the automatic gain control mode to the automatic level control mode.

20. The optical amplifier supervisory control method as claimed in claim 19, wherein said changing of the optical preamplifier from the automatic level control mode to the automatic gain control mode does not occur unless at least one of an input to the optical node and the gain of the optical pre-amplifier remains substantially constant for a second predetermined period of time after the output of the optical pre-amplifier falls wit in the target output range for at least the first predetermined period of time.

\* \* \* \* \*

UNITED STATES PATENT AND TRADEMARK OFFICE
CERTIFICATE OF CORRECTION

PATENT NO. : 6,977,771 B2
APPLICATION NO. : 10/083162
DATED : December 20, 2005
INVENTOR(S) : Taro Asao et al.

It is certified that error appears in the above-identified patent and that said Letters Patent is hereby corrected as shown below:

Column 17, Line 8, delete "tailed" and insert -- started -- therefor.
Column 18, Line 12, delete "e" and insert -- the -- therefor.
Column 18, Line 30, delete "preamplifier" and insert -- pre-amplifier -- therefor.
Column 18, Line 36, delete "preamplifier" and insert -- pre-amplifier -- therefor.
Column 18, Line 47, delete "preamplifier" and insert -- pre-amplifier -- therefor.
Column 18, Line 53, delete "preamplifier" and insert -- pre-amplifier -- therefor.
Column 18, Line 58, delete "wit in" and insert -- within -- therefor.

Signed and Sealed this

First Day of August, 2006

JON W. DUDAS
*Director of the United States Patent and Trademark Office*